(No Model.)   4 Sheets—Sheet 1.

E. MOREL & F. T. LOMONT.
M. P. LOMONT, Administratrix of F. T. LOMONT, Deceased.
ROAD SCRAPER.

No. 433,482.   Patented Aug. 5, 1890.

Mrs Mary P. Lomont
Administratrix
of the estate of
Francis T. Lomont
Inventor Deceased
and Edward Morel By their Attorneys (No Model.) 4 Sheets—Sheet 2.

E. MOREL & F. T. LOMONT.
M. P. LOMONT, Administratrix of F. T. LOMONT, Deceased.
ROAD SCRAPER.

No. 433,482. Patented Aug. 5, 1890.

Witnesses:
M. C. Fowler
W. J. Duvall

Mrs Mary P Lomont
Administratrix
of the estate of
Francis T Lomont
Inventor Deceased
and Edward Morel By their Attorneys
C. A. Snow & Co.

(No Model.) 4 Sheets—Sheet 3.
E. MOREL & F. T. LOMONT.
M. P. LOMONT, Administratrix of F. T. LOMONT, Deceased.
ROAD SCRAPER.
No. 433,482. Patented Aug. 5, 1890.
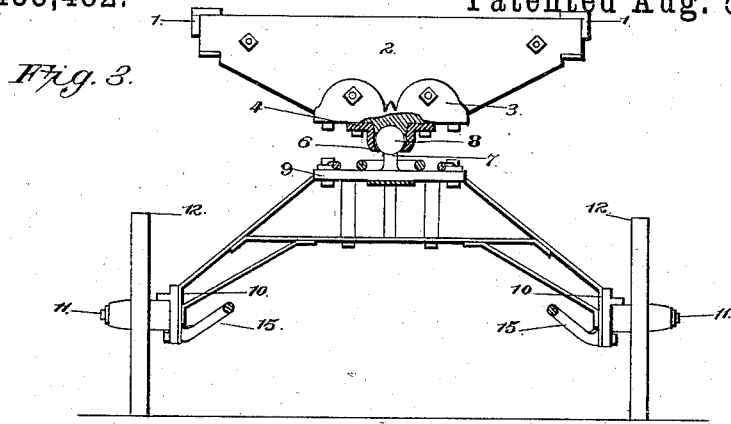
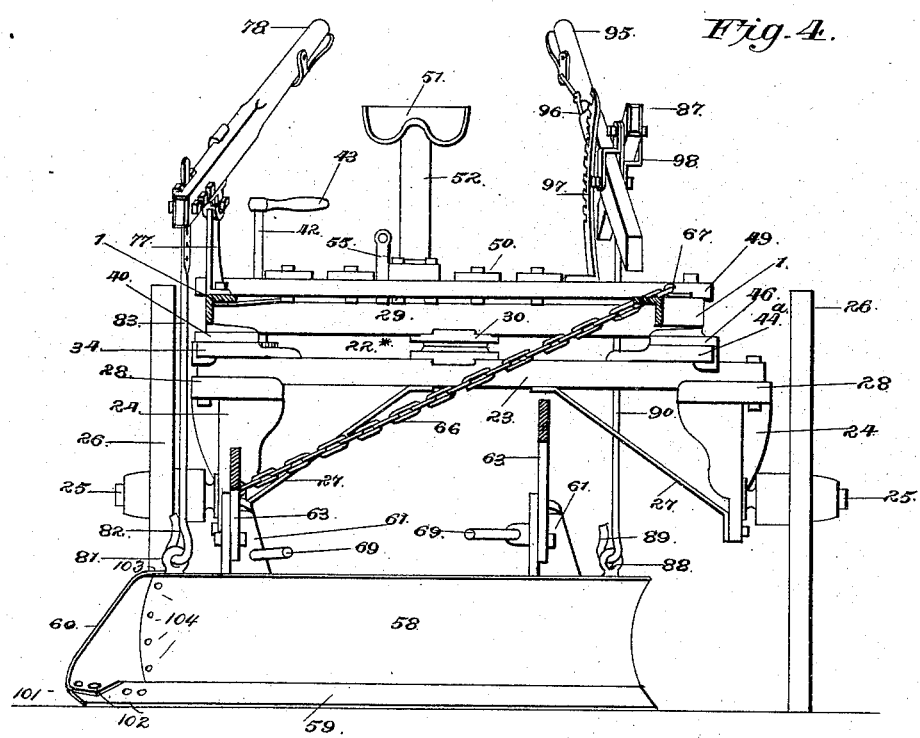

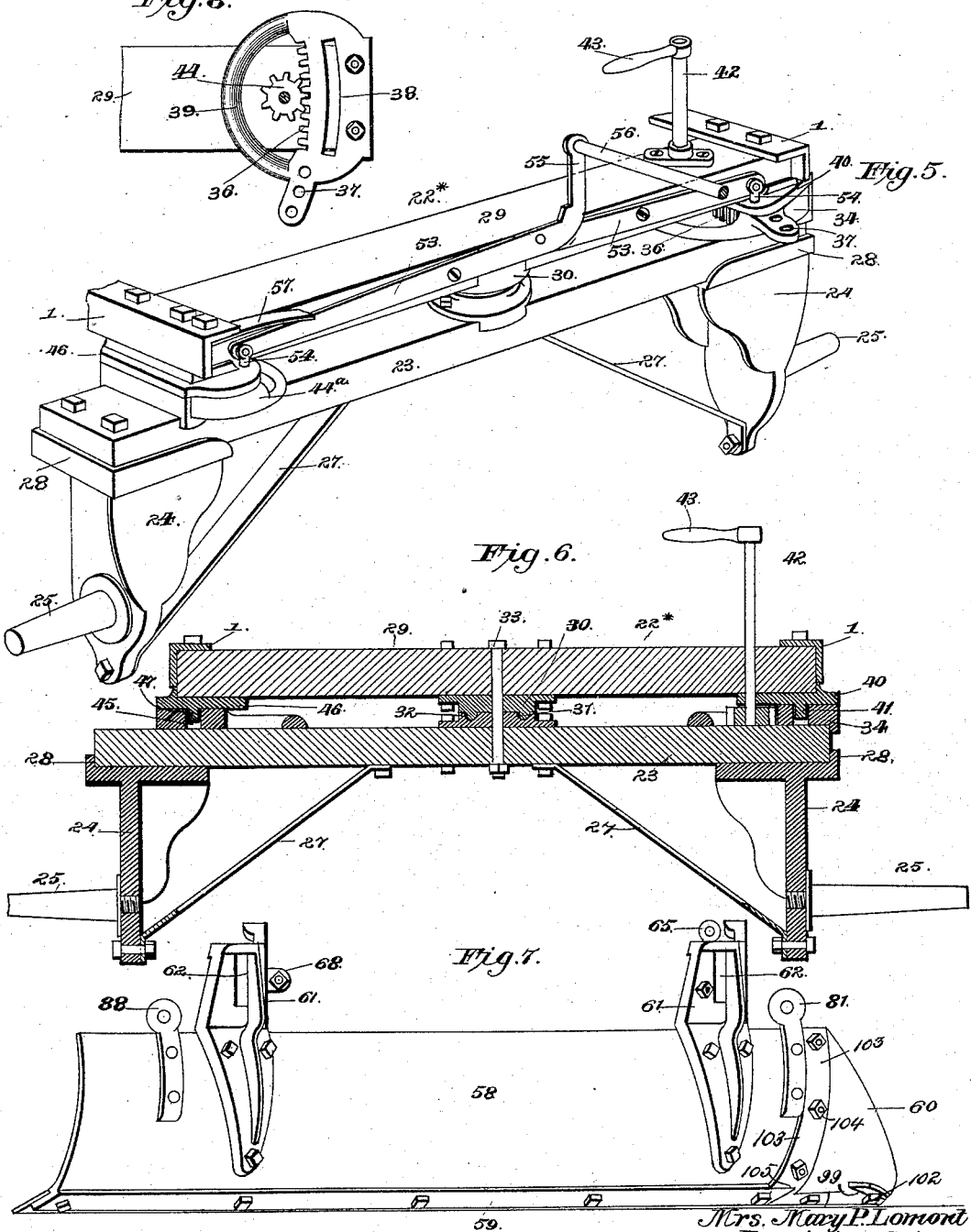

UNITED STATES PATENT OFFICE.

EDWARD MOREL, OF AUBURN, AND MARY P. LOMONT, OF FORT WAYNE, INDIANA, ADMINISTRATRIX OF FRANCIS T. LOMONT, DECEASED.

ROAD-SCRAPER.

SPECIFICATION forming part of Letters Patent No. 433,482, dated August 5, 1890.

Application filed January 25, 1890. Serial No. 338,151. (No model.)

*To all whom it may concern:*

Be it known that we, EDWARD MOREL, a citizen of the United States, residing at Auburn, De Kalb county, Indiana, and MARY P. LO-MONT, a citizen of the United States, residing at Fort Wayne, in the county of Allen and State of Indiana, and administratrix of the estate of FRANCIS T. LOMONT, deceased, late a citizen of the United States, residing at Fort Wayne, in the county of Allen and State of Indiana, (as by reference to the duly-certified copy of letters of administration hereto annexed will more fully appear,) do hereby declare that EDWARD MOREL and FRANCIS T. LOMONT invented a new and useful Improvement in Road-Scrapers, of which the following is a specification.

This invention has relation to road-scrapers, and the objects and advantages of the invention, together with the novel features thereof, will hereinafter appear, and be particularly pointed out in the appended claims.

Figure 1:
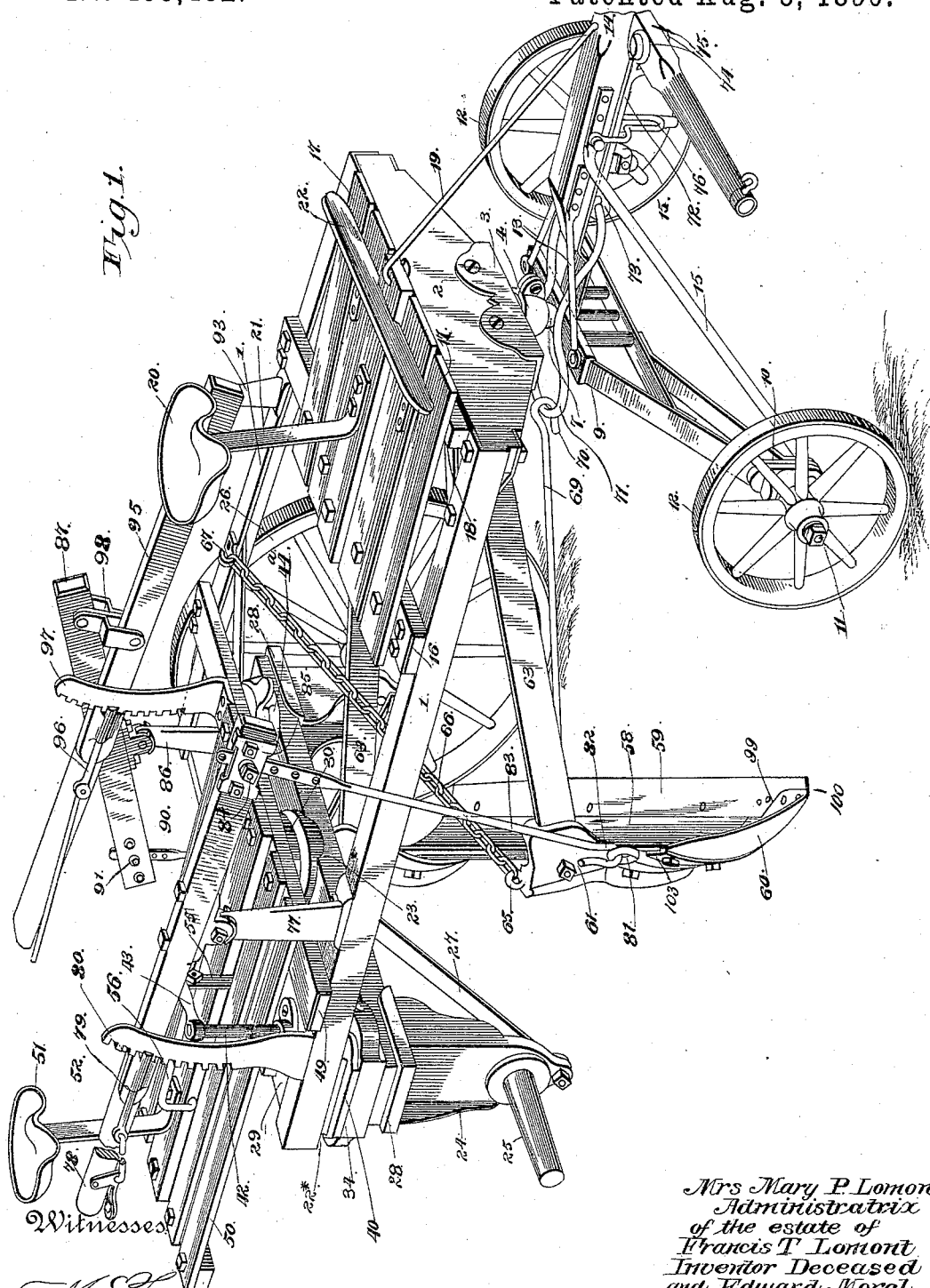
Figure 2:
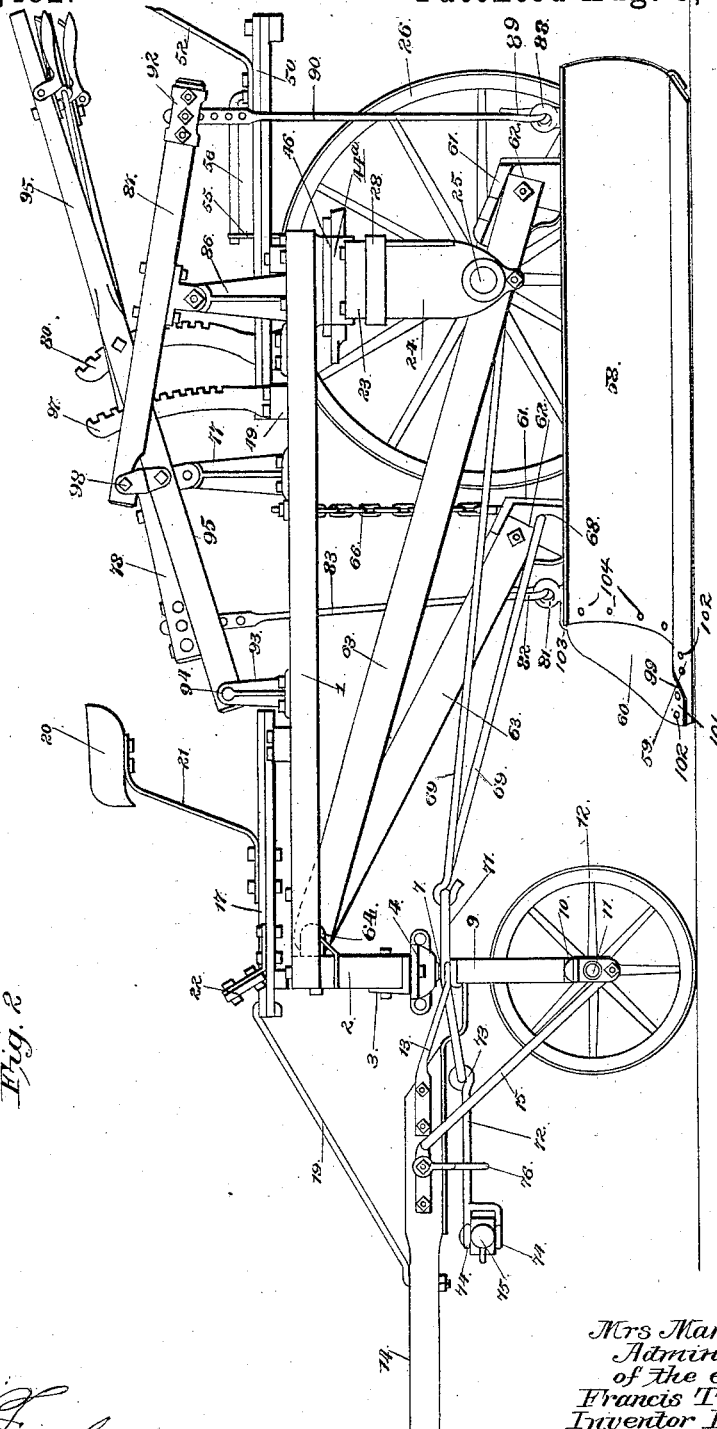

Referring to the drawings, Figure 1 is a perspective of a road-scraper constructed in accordance with the invention. Fig. 2 is a side elevation. Fig. 3 is a detail in front elevation of the front truck. Fig. 4 is a transverse section through the center of the machine. Fig. 5 is a perspective of the rear axle, the platform removed, and portions broken away. Fig. 6 is a transverse section through said axle. Fig. 7 is a detail in perspective of the scraper-blade. Fig. 8 is a detail, hereinafter referred to.

Like numerals of reference indicate like parts in all the figures of the drawings.

1 represents the opposite longitudinal side sills, in this instance formed of angle-iron, one of said sills being flared or slightly outwardly disposed near its rear end. The two forward ends of the sills are securely bolted to the head-block 2, the lower central edge of which is provided with a metal facing 3, to which is bolted a socket 4, formed of opposite concaved halves bolted together and provided with an opening 6 at their lower ends, in which is mounted a vertical shank 7, provided at its upper end with a ball 8 snugly fitting within the socket, said shank being mounted upon the central portion of the front axle 9, the opposite ends of which depend, as at 10, and from each projects a stub axle 11, carrying the front wheels 12. Converging arms 13 project from the upper edge of the axle, and are bolted at their front ends to the draft-pole 14, and similar inclined bars 15 have their rear ends bolted to the depending portions of the axle 9 and their front ends bolted to said draft-pole.

16 represents a transverse bar bolted to the side sills 1 slightly in rear of the bolster, and to the upper surface of the bar are secured a series of forwardly-projecting slats 17, the front ends of which are free to vibrate or spring, and are connected by a cross-strip 18.

19 represents a rod leading from one of the slats to the draft-pole, whereby the movement of the platform formed by the slats is limited.

20 represents the driver's seat, mounted upon a spring-standard 21, extending upwardly from the central slat of the series, and 22 represents the foot-board or dash. By this construction it will be seen that the slats combine to form a platform for the driver, the front edge of the platform being free and resilient, thus lending ease to the occupant of the seat, the rod 19 serving to limit the upward movement or vibration of the platform.

22* represents the rear frame-work, and the same comprises a transverse axle 23, from the opposite end of which depend standards 24. From the lower ends of the latter project stub axles 25 carrying the wheels 26. Braces 27 extend from the lower ends of the standards to the axle, to which they are bolted.

The upper ends of the standards are provided with a vertical flange 28, which embraces the sides and ends of the transverse axle.

The rear ends of the side sills are connected by a bolster 29, and at its center said bolster is provided with the upper section 30 of a fifth-wheel, the same being provided with a series of annular ribs 31, taking into a corresponding series of annular grooves 32, formed in the lower section of said fifth-wheel, and through the two sections there is inserted a king-bolt 33, whereby the rear truck or axle is pivotally connected with the rear end of the scraper.

To one end of the rear axle there is secured a plate 34, the inner edge of which is curved and provided with a rack-bar 36, and beyond the teeth of said bar is a series of small perforations 37 in the rear of the rack-bar or teeth at the outer ends of the plate. The same is provided with a curved slot 38, and in front of the teeth the plate is provided with a semicircular ring 39. The adjacent face of the rear bolster is provided with a metal plate 40, from which depend a pair of guide-lugs 41, which ride in the curved slot of the plate.

42 represents a vertical crank-shaft journaled in the bolster and provided with a crank 43 at its upper end and at its lower end with a pinion 44, which meshes with the semicircular rack. At the opposite upper end of the axle there is mounted a plate 44ª, which is very similar to the plate just described, with the exception that said plate is not toothed, but is plain. The plate is provided with a curved slot 45, and above said plate and secured to the bolster there is an upper guide-plate 46, a pair of depending lugs 47 of the same riding in the slot. The lower plate is also provided with a series of perforations.

49 represents the cross-bars connecting the two side sills 1, and from the same there projects rearwardly a series of strips 50 connected at their outer ends and forming a spring-platform for the support of the seat 51, which is mounted upon the standard 52, said seat being adapted for the occupancy of the operator.

53 represents a pair of locking-levers pivoted together at their inner ends, and at their centers they are pivoted to the rear face of the bolster. The outer ends of the levers terminate in depending locking-pins 54, each of which project through a perforation in the upper side of the guide-plates secured to the bolster, the ends of the lugs being designed to take into any one of the series of perforations in the adjacent lower plates. One of the levers 53 is continued beyond its inner pivot to form an arm 55 projecting up between the slats of the rear platform, and in the upper end of the said lever there is mounted a bell-crank-shaped rocking arm 56, the rear end of which is pivotally mounted in the platform. A spring 57 normally depresses the locking-levers, thus maintaining the locking-pins within the perforations.

58 represents the scraper frame or bar, and to the lower edge of the same is secured a blade 59, said frame being diagonally disposed to the line of draft and terminating at its forward end in a plow-point 60. The plow-point is not formed integral with the scraper-bar or its blade, but is secured thereto in the following manner: The plow-point is of triangular shape and of concavo form, and its lower edge is provided with an inclined slot 99. This slot might be said to be doubly inclined, for the reason that it does not pass directly transverse through and through, but at an angle, the rear edges of the slot being nearer toward the plow-point than the front edges. By this slot the point is divided into two wings, the lower edges of which extend below the edge of the scraper-bar and flush, or nearly so, with the scraper-blade, which latter is passed through the doubly-inclined slot, the inner wing 100 taking in rear of the blade and the outer wing 101 in front of said blade, and the blade and wings are bolted through and through, as at 102. The inner vertical side edge of the plow has a rear offset 103, which takes back of the scraper-bar and is bolted thereto, as at 104. The lower corner of the plow-point is notched or recessed, as at 105, and into the same is fitted the end of the scraper-bar, all as clearly shown in the drawings. It is apparent that the plow may be removed when desired.

61 represents castings bolted to the scraper-bar near the ends of the same, said castings being provided with transverse recesses 62, in which are pivoted the rear ends of longitudinal bars 63, the front ends of the bars being pivotally mounted in brackets 64 secured to the front bolster of the machine. The forward one of the castings is provided with an eye 65, to which is connected one end of a link-chain 66, the opposite end of the chain being connected to the opposite side of the sill 1, as at 67. Each of the castings is also provided at its inner side with an eye 68, in each of which terminate the threaded end of a rod 69 secured thereto by nuts mounted on the ends. The opposite ends of the rod terminate in hooks 70, which loosely embrace the rear end of an elliptical bail 71. The latter embraces and encircles the ball-and-socket joint that connects the front axle with the front bolster.

72 represents a draft rod or bar, the rear end of which is bent to form a hook 73, and loosely connected to the bail, and the forward end of which forms opposite eyes 74 adapted to receive a singletree 75, the forward end of the bar being supported by a depending link 76 secured to the tongue of the machine.

Upon the sill opposite the advanced end of the scraper there is mounted in rear of said end a standard 77, and pivoted to the same is a hand-lever 78, upon which is pivoted a spring-actuated bolt 79, normally meshing with the teeth of the vertical rack-bar 80. The forward end of the scraper-bar is provided with an eye 81, in which is loosely connected the lower hooked end 82 of a vertical rod 83, the upper end of the rod being perforated, and by a bolt 84 secured to the forward end of the lever 78. A plate 85 is bolted to the end of the lever and embracing the rod 83.

Upon the left-hand side of the rear bolster there is mounted a vertical standard 86, upon which is pivoted at its center a rocking lever 87. An eye 88 is mounted upon the rear end of the scraping-bar and receives the bent end 89 of a vertical rod 90, the upper end of which is provided with a series of perforations and by a bolt 91 is adjustably connected to the rear end of the rocking lever, a plate 92 being bolted to the lever and embracing the rod.

93 represents a short standard mounted on the adjacent sill 1, and in the upper end of the same, as at 94, there is pivoted the forward end of a hand-lever 95, upon which is mounted a spring-bolt 96, engaging with a toothed rack-bar 97, secured to the cross-bar that connects the side sills and supports the rear platform. A link 98 loosely connects the front end of the rocking lever with the hand-lever in rear of the pivot of the latter, so that by an elevation or depression of the hand-lever a contrary movement of the rear end of the rocking lever takes place, and consequently the scraper-bar is raised or lowered.

From the above description it will be seen that the draft is applied directly to the scraper-blade and not first to the machine, (consequently the latter simply acts as a support for the blade,) and that by raising or lowering of the levers a proper angle may be given the blade with relation to the ground to be scraped, and that as one end of said blade terminates in a plow-point the same may be used for the reduction of small hillocks or other raised portion of the ground, whereby the employment of a separate plow for this purpose is obviated.

By depressing the inner ends of the two pivoted locking-levers through the medium of the foot-lever the operator may partially or wholly revolve the vertical crank-shaft which carries the small pinion, and thus throw the rear axle out of a right-angular disposition with relation to the line of draft, so that the rear portion of the machine has a constant tendency against the force produced by the blade coming in contact with the earth, which usually tends to deflect or switch the machine out of a straight line. When the operator shall have turned the axle to a proper inclination or angle by a releasing of the pivoted locking-levers, the pins of the same take into adjacent perforations, and thus said axle is securely locked against a return-movement.

Having thus described the invention of EDWARD MOREL and FRANCIS T. LOMONT, what is claimed is—

1. In a road-scraper, the combination, with the scraping-blade, means for supporting the same, the front axle, and the tongue, of a link depending from the tongue, a draft-bar mounted for sliding in the link and provided at its front end with a singletree and having its rear end terminating in a hook, an elliptical bail mounted on the front axle and engaging the hooked end of the bar, and opposite diverging rods having their rear ends connected to the scraper-bar near its ends and having their forward ends bent to form hooks engaging the rear end of the elliptical bail, substantially as specified.

2. In a road-scraper, the scraper-bar, in combination with the plow-point, the inner edge of which is provided with a rearwardly-disposed offset embracing the rear surface of the blade and bolted thereto, the lower inner corner of the point being recessed to receive the lower corner of the bar, substantially as specified.

3. In a road-scraper, the combination, with the scraper-bar provided at its lower end with a scraper-blade projecting beyond the end of the bar, of the triangular plow-point, the base of which is provided with an inclined slot forming opposite side wings, said blade overlapping the inner wing, passed through the slot, and taking in rear of the outer wing, bolts passed through the wings and blade, and the inner edge of the point taking in rear of and being bolted to the adjacent end of the bar, substantially as specified.

4. In a road-scraper, the combination, with the frame thereof, of a scraper-bar, castings mounted on the bar near its ends and provided with recesses in line with the draft-bars, and said opposite inclined bars pivoted at their front ends to the front of the frame and having their rear ends pivoted in the recessed castings, substantially as specified.

5. In a road-scraper, the combination, with the frame-work provided at its front end with a bolster and a front axle having a tongue, the axle being pivoted to the bolster, of a link depending from the tongue, a draft-bar mounted for sliding in the link, a draft-bail loosely connected to the rear end of the link and encircling the pivot of the axle, draft-rods having their front ends loosely connected to the rear end of the bail and their rear ends threaded, a scraper-bar adjustably supported under the frame-work, castings secured near the ends of the bar and having perforations for the reception of the threaded ends of the draft-rods, and nuts for the rods, said castings being provided with recesses in line with the frame and opposite inclined bars pivoted at their front ends in brackets secured to the bolsters and having their rear ends mounted in recesses of the castings and bolted to the walls of the same, substantially as specified.

6. In a road-scraper, the combination, with the frame and its front bolster having opposite semi-concaved castings bolted together and a superimposed wearing-plate, of the front axle having a king-bolt terminating at its upper end in a ball bearing on the wearing-plate and surrounded by the socket formed by the semi-concaved castings, and a loosely-extended scraper-bar, substantially as specified.

7. The combination, with the opposite side sills, of the cross-bar connecting the same in rear of their front ends, a series of longitudinal strips or slats projecting forwardly from the cross-bar and connected at their front ends and unsupported, and a driver's seat mounted on the platform thus constructed, substantially as specified.

8. The combination, with the front axle, the front bolster pivoted thereto, the tongue projecting from the axle, and the side sills from the bolster, of the transverse bars connecting the sills, a spring-platform having one end connected to the bar and its opposite end free to vibrate, a driver's seat mounted on the platform, and a rod having one end connected to the pole and the other to the free end of the platform for limiting the vibrations of the same, substantially as specified.

9. In a road-scraper, the combination, with the side sills, of a transverse bar mounted on the same near their rear ends, a spring-platform extending rearwardly from the bar and beyond the end of the frame-work, and an operator's seat arranged at the rear end of the same and in juxtaposition to the scraper-blade-operating levers, substantially as specified.

10. In a road-scraper, the combination, with the frame, of the rear axle centrally pivoted to the frame, a suspended scraper-bar diagonally disposed and passing under the axle, a perforated locking-plate located upon the axle at one side of the pivot, and a lever pivoted to the frame and having a locking-pin adapted for normal engagement with one of the perforations of the locking-plate, substantially as specified.

11. In a road-scraper, the combination, with the frame, of the arched rear axle centrally pivoted thereto, the loosely-suspended scraping-bar arranged diagonally of the frame and under the pivot, perforated locking-plates mounted upon the axle at each side of the pivot, and opposite levers pivoted to the frame at each side of the central pivot of the axle and terminating at their outer ends in locking-pins for taking into the perforations of the plates, substantially as specified.

12. In a road-scraper, the combination, with the rear bolster, of the rear axle, a fifth-wheel mounted between the two, perforated locking-plates secured to the axle near its ends, means for operating the axle upon its pivot, a pair of levers pivoted to the bolster and provided with locking-pins adapted to take in the perforations of the plates, a spring for normally depressing the pins into the perforations, and a foot-lever for operating the locking-levers and raising the pins, substantially as specified.

13. In a road-scraper, the combination, with the rear bolster and axle, of a fifth-wheel interposed between the bolster and axle, a plate secured to said axle near one end and provided with a curved series of teeth, and a crank-shaft mounted vertically in the bolster and having a pinion meshing with the teeth of the plate, substantially as specified.

14. In a road-scraper, the combination, with the rear bolster and axle, of a fifth-wheel interposed between the two and opposite plates mounted on its axle near its ends and provided with curved slots, opposite plates secured to the bolster and having depending lugs riding in the slots, and means for swinging the axle out of a right angle with relation to the frame of the machine and for locking the same in a desired position, substantially as specified.

15. In a road-scraper, the combination, with the rear bolster and axle, of a fifth-wheel interposed between the two and opposite plates mounted on the axle near its ends and provided with curved slots, one of said plates being provided with a curved series of teeth, opposite plates secured to the bolster and having depending lugs riding in the slots, and a crank-shaft mounted in the bolster and provided with a pinion engaging the teeth of the plate, substantially as specified.

16. In a road-scraper, the combination, with the rear axle and bolster and an interposed fifth-wheel connecting the two at their centers, of plates mounted near the ends of the axle provided with curved slots and perforations, and one of said plates with a curved series of teeth, opposite plates secured to the under surface of the bolster and provided with depending lugs riding in the curved slots, and a pair of levers pivoted together at their inner ends and independently pivoted to the bolster at about their centers and provided with locking-pins depending through the upper plates of the bolster and adapted to engage the perforations of the lower locking-plate, one of said levers terminating at its inner end in an upwardly-projecting arm, a rock-arm pivoted to the frame of the machine and at one end to said upwardly-projecting arm and serving as a foot-lever, and a spring pressing upon one of the locking-levers and serving to normally depress the outer ends of said levers, substantially as specified.

17. In a road-scraper, the blade 59, combined with the whiffletree, the pair of draft-rods 69, connected with the whiffletree and diverging rearwardly and connected to the opposite ends of the scraper-blade, the casting 61, bolted to the ends of the scraper-bar, and the longitudinal bars 63, pivotally connected to the bolster and also pivoted in openings in the castings, as set forth.

18. In a road-scraper, the two bars 63, pivotally secured together at their front ends and to the bolster at its center, the scraper-blade to which the other ends of the bars are pivoted transversely, and the mechanism for independently raising and lowering the ends of the scraper-blade, which mechanism is duplicated, as set forth.

In testimony that we claim the foregoing as the invention of EDWARD MOREL and FRANCIS T. LOMONT we have hereto affixed our signatures in presence of two witnesses.

EDWARD MOREL.
MARY P. LOMONT,
*Administratrix of the estate of Francis T. Lomont, deceased.*

Witnesses:
M. V. B. SPENCER,
JACOB BILL.